United States Patent [19]

Tanakura et al.

[11] 4,270,181
[45] May 26, 1981

[54] DATA PROCESSING SYSTEM HAVING A HIGH SPEED PIPELINE PROCESSING ARCHITECTURE

[75] Inventors: Yoshiyuki Tanakura, Numazu; Keiichiro Uchida, Kawasaki, both of Japan

[73] Assignee: Fujitsu Limited, Japan

[21] Appl. No.: 70,611

[22] Filed: Aug. 29, 1979

[30] Foreign Application Priority Data

Aug. 31, 1978 [JP] Japan .............................. 53-106494

[51] Int. Cl.³ .............................................. G06F 7/38
[52] U.S. Cl. ...................................... 364/736; 364/200
[58] Field of Search .......... 364/736, 748, 200 MS File

[56] References Cited

U.S. PATENT DOCUMENTS

| | | | |
|---|---|---|---|
| 3,697,734 | 10/1972 | Booth et al. | 364/748 |
| 3,875,391 | 4/1975 | Shapiro et al. | 364/736 |
| 4,025,771 | 5/1977 | Lynch, Jr. et al. | 364/736 |
| 4,128,880 | 12/1978 | Cray, Jr. | 364/200 |

OTHER PUBLICATIONS

Ramamoorthy et al., "Pipeline Architecture", *Computing Surveys*, vol. 9, No. 1, Mar. 1977, pp. 61-102.

*Primary Examiner*—David H. Malzahn
*Attorney, Agent, or Firm*—Staas & Halsey

[57] ABSTRACT

A data processing system having a pipeline processing architecture for performing a sequence of operations upon each group of data, one of which is a conditional group, comprising a main pipeline for performing the sequence of operations upon the data other than the conditional data and a sub-pipeline for processing the conditional data, wherein the two pipelines are synchronized on the same time base so that executing time is determined only by the main pipeline.

14 Claims, 29 Drawing Figures

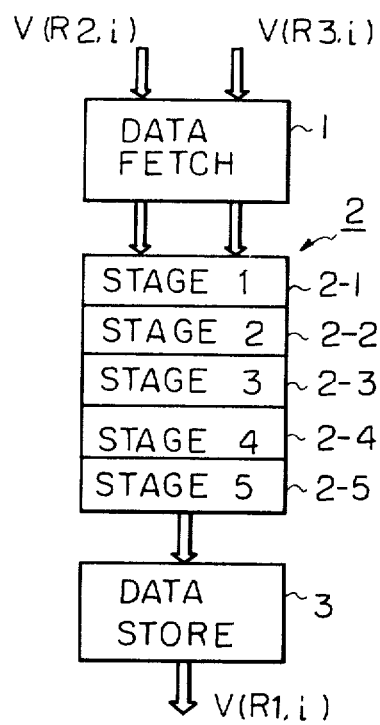

Fig. 2a

| | |
|---|---|
| V(R2,1), V(R3,1) | 2-1 |
| 0 , 0 | 2-2 |
| 0 | 2-3 |
| 0 | 2-4 |
| 0 | 2-5 |

Fig. 2b

| | |
|---|---|
| V(R2,2), V(R3,2) | 2-1 |
| V(R2,1), V(R3,1) | 2-2 |
| 0 | 2-3 |
| 0 | 2-4 |
| 0 | 2-5 |

Fig. 2c

| | |
|---|---|
| V(R2,3), V(R3,3) | 2-1 |
| V(R2,2), V(R3,2) | 2-2 |
| V(R2,1)+V(R3,1) | 2-3 |
| 0 | 2-4 |
| 0 | 2-5 |

Fig. 2d

| | |
|---|---|
| V(R2,4), V(R3,4) | 2-1 |
| V(R2,3), V(R3,3) | 2-2 |
| V(R2,2)+V(R3,2) | 2-3 |
| V(R2,1)+V(R3,1) | 2-4 |
| 0 | 2-5 |

Fig. 2e

| | |
|---|---|
| V(R2,5), V(R3,5) | 2-1 |
| V(R2,4), V(R3,4) | 2-2 |
| V(R2,3)+V(R3,3) | 2-3 |
| V(R2,2)+V(R3,2) | 2-4 |
| V(R2,1)+V(R3,1) | 2-5 |

Fig. 4a

| V(R2,1), V(R3,1) | 2-1 |
|---|---|
| 0 , 0 | 2-2 |
| 0 | 2-3 |
| 0 | 2-4 |
| 0 | 2-5 |

| V(M,1) | 5-1 |
|---|---|
| 0 | 5-2 |
| 0 | 5-3 |
| 0 | 5-4 |
| 0 | 5-5 |

Fig. 4b

| V(R2,2), V(R3,2) | 2-1 |
|---|---|
| V(R2,1), V(R3,1) | 2-2 |
| 0 | 2-3 |
| 0 | 2-4 |
| 0 | 2-5 |

| V(M,2) | 5-1 |
|---|---|
| V(M,1) | 5-2 |
| 0 | 5-3 |
| 0 | 5-4 |
| 0 | 5-5 |

Fig. 4c

| V(R2,3), V(R3,3) | 2-1 |
|---|---|
| V(R2,2), V(R3,2) | 2-2 |
| V(R2,1)+V(R3,1) | 2-3 |
| 0 | 2-4 |
| 0 | 2-5 |

| V(M,3) | 5-1 |
|---|---|
| V(M,2) | 5-2 |
| V(M,1) | 5-3 |
| 0 | 5-4 |
| 0 | 5-5 |

Fig. 4d

| | | | |
|---|---|---|---|
| V(R2,4), V(R3,4) | 2-1 | V(M,4) | 5-1 |
| V(R2,3), V(R3,3) | 2-2 | V(M,3) | 5-2 |
| V(R2,2)+V(R3,2) | 2-3 | V(M,2) | 5-3 |
| V(R2,1)+V(R3,1) | 2-4 | V(M,1) | 5-4 |
| 0 | 2-5 | 0 | 5-5 |

Fig. 4e

| | | | |
|---|---|---|---|
| V(R2,5), V(R3,5) | 2-1 | V(M,5) | 5-1 |
| V(R2,4), V(R3,4) | 2-2 | V(M,4) | 5-2 |
| V(R2,3)+V(R3,3) | 2-3 | V(M,3) | 5-3 |
| V(R2,2)+V(R3,2) | 2-4 | V(M,2) | 5-4 |
| V(R2,1)+V(R3,1) | 2-5 | V(M,1) | 5-5 |

Fig. 6a

| V(R2,1), V(R3,1) | 2-1 |
|---|---|
| 0 , 0 | 2-2 |
| 0 | 2-3 |
| 0 | 2-4 |
| 0 | 2-5 |

| V(R4,1) | 5'-1 |
|---|---|
| 0 | 5'-2 |
| 0 | 5'-3 |
| 0 | 5'-4 |
| 0 | 5'-5 |

Fig. 6b

| V(R2,2), V(R3,2) | 2-1 |
|---|---|
| V(R2,1), V(R3,1) | 2-2 |
| 0 | 2-3 |
| 0 | 2-4 |
| 0 | 2-5 |

| V(R4,2) | 5'-1 |
|---|---|
| V(M,1) | 5'-2 |
| 0 | 5'-3 |
| 0 | 5'-4 |
| 0 | 5'-5 |

Fig. 6c

| V(R2,3), V(R3,3) | 2-1 |
|---|---|
| V(R2,2), V(R3,2) | 2-2 |
| V(R2,1)+V(R3,1) | 2-3 |
| 0 | 2-4 |
| 0 | 2-5 |

| V(R4,3) | 5'-1 |
|---|---|
| V(M,2) | 5'-2 |
| V(M,1) | 5'-3 |
| 0 | 5'-4 |
| 0 | 5'-5 |

Fig. 6d

| | | | |
|---|---|---|---|
| V(R2,4), V(R3,4) | 2-1 | V(R4,4) | 5-1 |
| V(R2,3), V(R3,3) | 2-2 | V(M,3) | 5-2 |
| V(R2,2)+V(R3,2) | 2-3 | V(M,2) | 5-3 |
| V(R2,1)+V(R3,1) | 2-4 | V(M,1) | 5-4 |
| 0 | 2-5 | 0 | 5-5 |

Fig. 6e

| | | | |
|---|---|---|---|
| V(R2,5), V(R3,5) | 2-1 | V(R4,5) | 5-1 |
| V(R2,4), V(R3,4) | 2-2 | V(M,4) | 5-2 |
| V(R2,3)+V(R3,3) | 2-3 | V(M,3) | 5-3 |
| V(R2,2)+V(R3,2) | 2-4 | V(M,2) | 5-4 |
| V(R2,1)+V(R3,1) | 2-5 | V(M,1) | 5-5 |

Fig. 8a

| 0, V(R2,1) | 2'-1 | I | 5-1 |
|---|---|---|---|
| 0 , 0 | 2'-2 | 0 | 5-2 |
| 0 | 2'-3 | 0 | 5-3 |
| 0 | 2'-4 | 0 | 5-4 |
| 0 | 2'-5 | 0 | 5-5 |

Fig. 8b

| 0 , 0 | 2'-1 | 0 | 5-1 |
|---|---|---|---|
| 0 , R(R2,1) | 2'-2 | I | 5-2 |
| 0 | 2'-3 | 0 | 5-3 |
| 0 | 2'-4 | 0 | 5-4 |
| 0 | 2'-5 | 0 | 5-5 |

Fig. 8c

| 0, V(R2,5) | 2'-1 | I | 5-1 |
|---|---|---|---|
| 0, V(R2,4) | 2'-2 | I | 5-2 |
| V(R2,3) | 2'-3 | I | 5-3 |
| 0 | 2'-4 | 0 | 5-4 |
| V(R2,1) | 2'-5 | I | 5-5 |

Fig. 8d

| | | | |
|---|---|---|---|
| V(R2,5), V(R2,10) | 2'-1 | 1 | 5-1 |
| V(R2,4), V(R2,9) | 2'-2 | 1 | 5-2 |
| V(R2,3) | 2'-3 | 0 | 5-3 |
| V(R2,7) | 2'-4 | 1 | 5-4 |
| V(R2,1)+V(R2,6) | 2'-5 | 1 | 5-5 |

Fig. 8e

| | | | |
|---|---|---|---|
| V(R2,5)+V(R2,10)+V(R2,15) | 2'-1 | 1 | 5-1 |
| V(R2,4)+V(R2,9)+V(R2,14) | 2'-2 | 1 | 5-2 |
| V(R2,3)+V(R2,13) | 2'-3 | 1 | 5-3 |
| V(R2,7)+V(R2,12) | 2'-4 | 1 | 5-4 |
| V(R2,1)+V(R2,6)+V(R2,11) | 2'-5 | 1 | 5-5 |

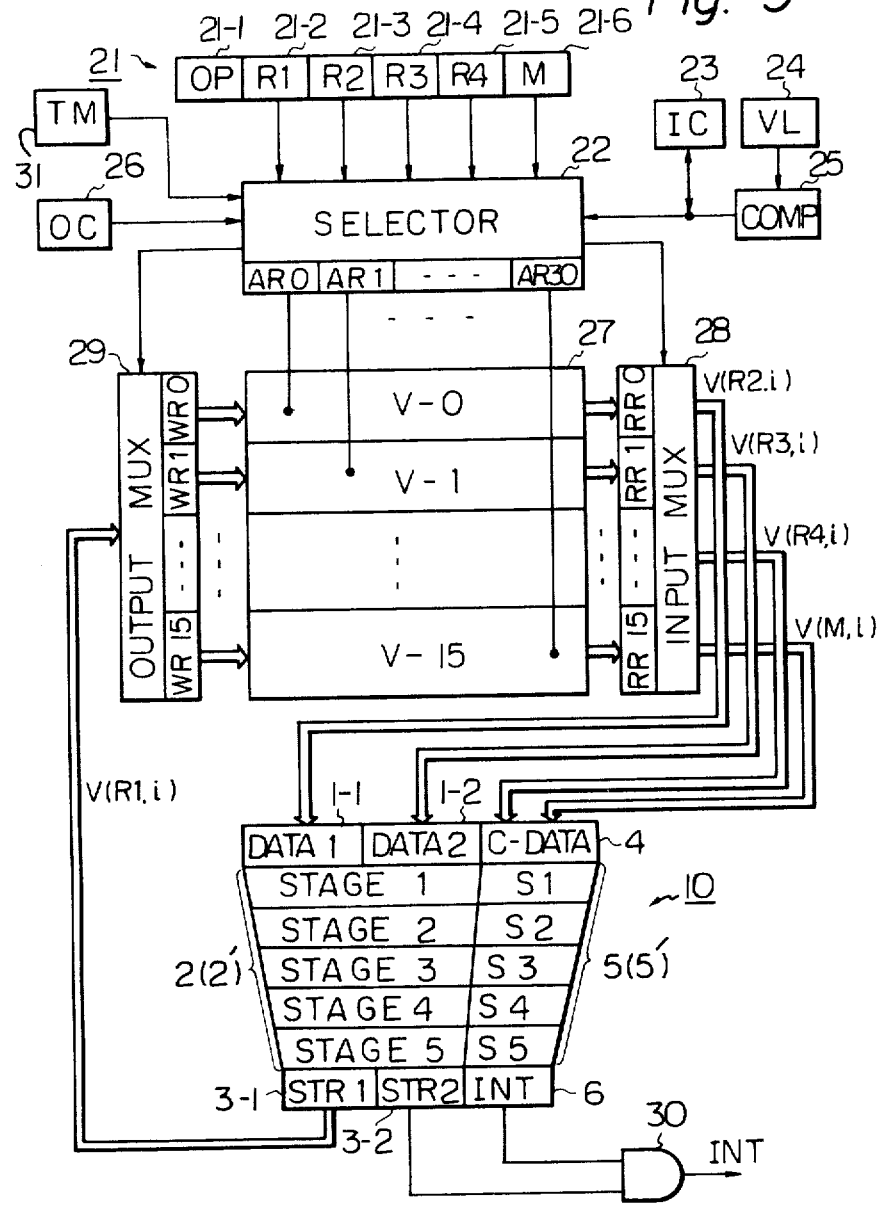

DATA PROCESSING SYSTEM HAVING A HIGH SPEED PIPELINE PROCESSING ARCHITECTURE

BACKGROUND OF THE INVENTION (1) Field of the Invention

This invention relates generally to a data processing system and, more particularly, to a data processing system with a pipeline processing architecture for performing a sequence of operations upon array data, such as matrix data and vector data, associated with a conditional operation.

(2) The Prior Art

In nuclear physics, meteorology, aerospace mechanics, etc., numerical analysis requires very complex computations at ultra-high speeds and capabilities greater than those of general purpose computers. Only a special purpose computer with array processing architecture can be used in such high-speed applications. One known array processing architecture is a pipeline processing architecture such as CDC STAR-100 comprising a plurality of logical or arithmetic stages, capable of being operated simultaneously, which are arranged in a pipeline. In the pipeline processing architecture, a sequence of input data or a sequence of groups of data is applied to the entry point of the pipeline, while a sequence of output data is obtained at the exit point of the pipeline, so that high data processing speed can be obtained.

The pipeline processing architecture of the prior art comprises only one pipeline used for performing a sequence of operations upon data. In general, there is a principle in the pipeline processing architecture that only the same operations are performed by each stage of a pipeline. As a result, if there are a large number of data groups, each group of which requires different operations, it is necessary for the pipeline processing architecture to have many pipelines arranged in series. For example, these pipelines are intended to perform the following steps.

Step 1: to sort the groups of data and collect the groups of data which require the same operations;

Step 2: to perform the same operations upon the groups of data which require the same operations;

Step 3: to store the operation results in vector registers or the like.

The executing time of each pipeline is composed of a rising time which is necessary for the initial data loading or the like and a real time for performing the operations. Therefore, the total executing time of all the pipelines with regard to the above-mentioned case is as follows:

$$T_{2e} = nt + d \text{ (Step 1)} \\ + cnt + d \text{ (Step 2)} \\ + nt + d \text{ (Step 3)} \tag{1}$$

where n: the number of repeated operation:
t: executing time of each stage of the pipelines;
d: rising time of the pipelines;
c: density of elements which require processing of step 2 ($0 \leq C \leq 1$).

As a result, it takes a long time to perform the operations upon the data which require different types of operations and a high processing speed cannot be obtained.

SUMMARY OF THE INVENTION

Therefore, it is a principal object of the present invention to provide a data processing system with a pipeline processing architecture which can perform a sequence of operations upon data at high speeds, even in cases where the data requires different operations, such as a conditional operation.

According to the present invention, there is provided a data processing system with a pipeline processing architecture for performing a sequence of operations upon each group of data, where some of the data is conditional data, comprising a main pipeline for performing a sequence of operations upon the remainder of the data and a sub-pipeline for transmitting the conditional data therein. The two pipelines are arranged in parallel, i.e., the stages of the main pipeline and those of the sub-pipeline are equal in number and synchronized on the same time base. As a result, the main pipeline is controlled at the entry or the exit thereof by the sub-pipeline. For example, the operation result of the main pipeline is determined to be valid or invalid at the exit thereof. Therefore, since the pipeline processing architecture for performing a sequence of operations upon the data which requires different operations is determined by only one pipeline, such as the main pipeline, the total executing time of the architecture according to the present invention is very small.

The present invention will be more clearly understood from the following description with reference to the accompanying drawings.

FIG. 1 is a block diagram illustrating a pipeline processing architecture of the prior art;

FIGS. 2a through 2e are block diagrams of the pipeline 2;

Figure 3:
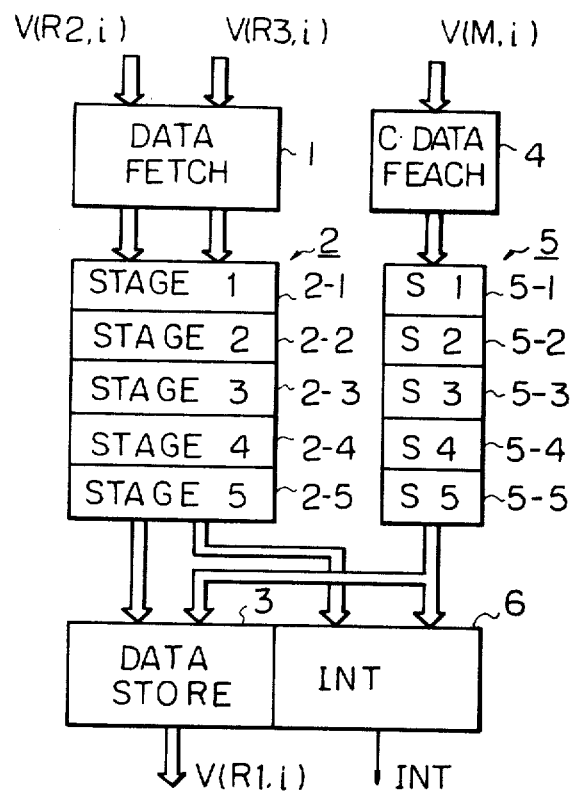
FIG. 3 is a block diagram illustrating a first embodiment of the pipeline processing architecture of the present invention.
Figure 5:
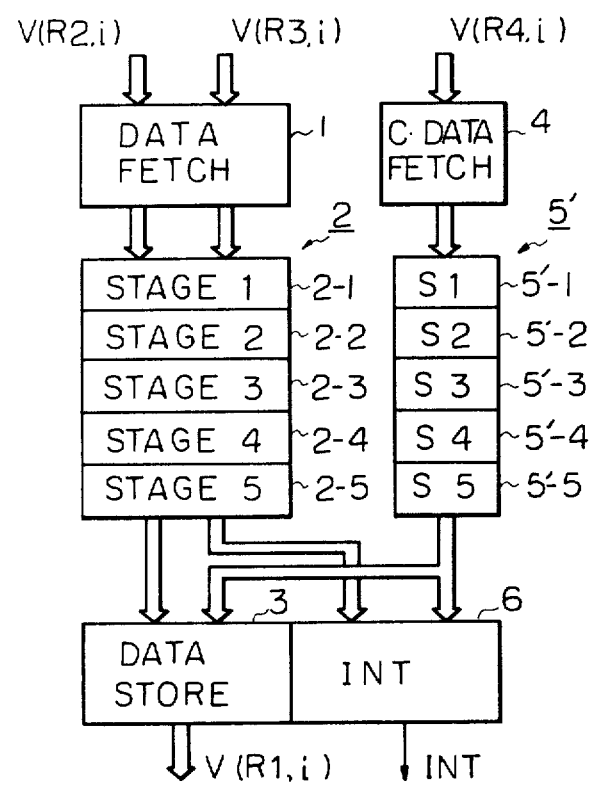
Figure 7:
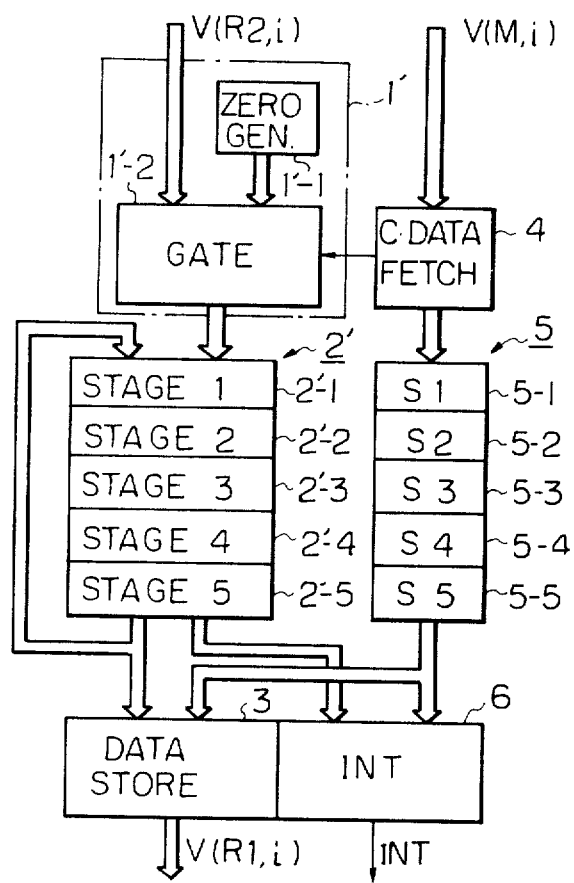
Figure 10:
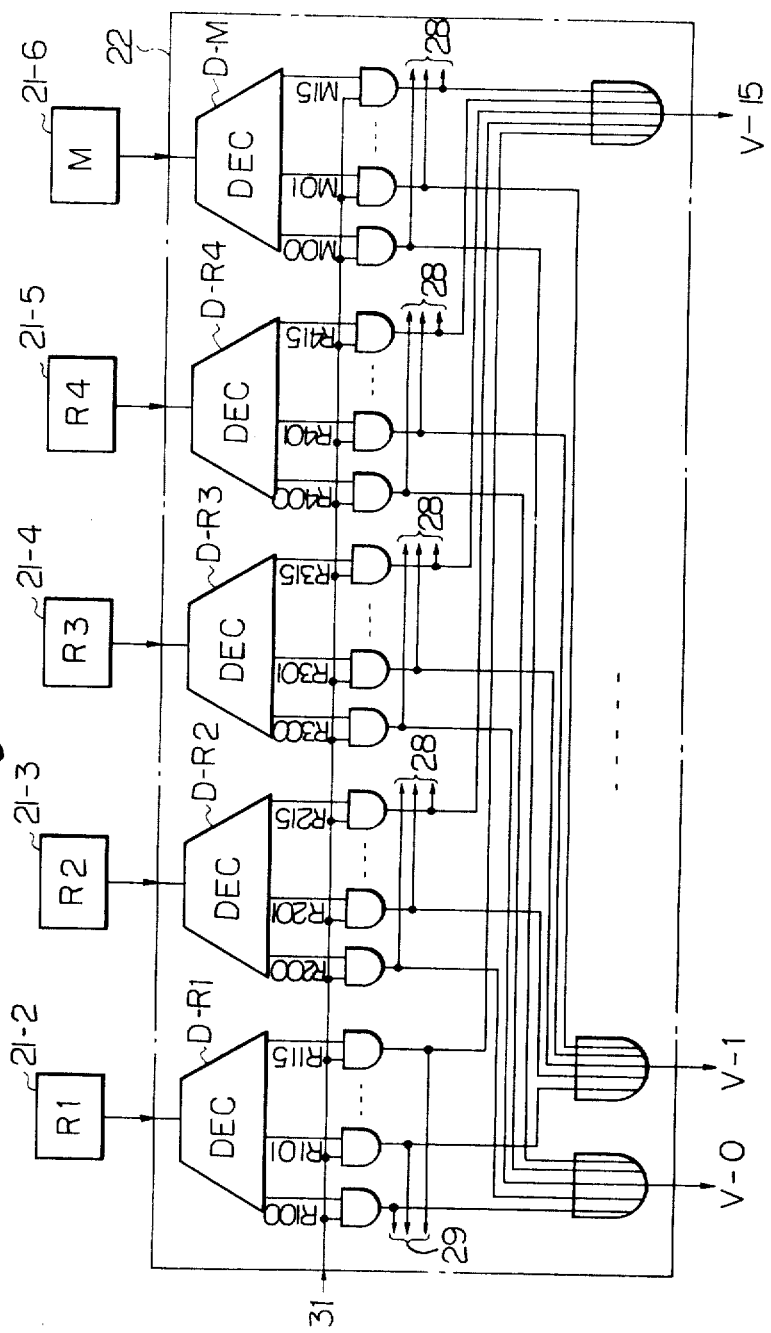
Figure 11:
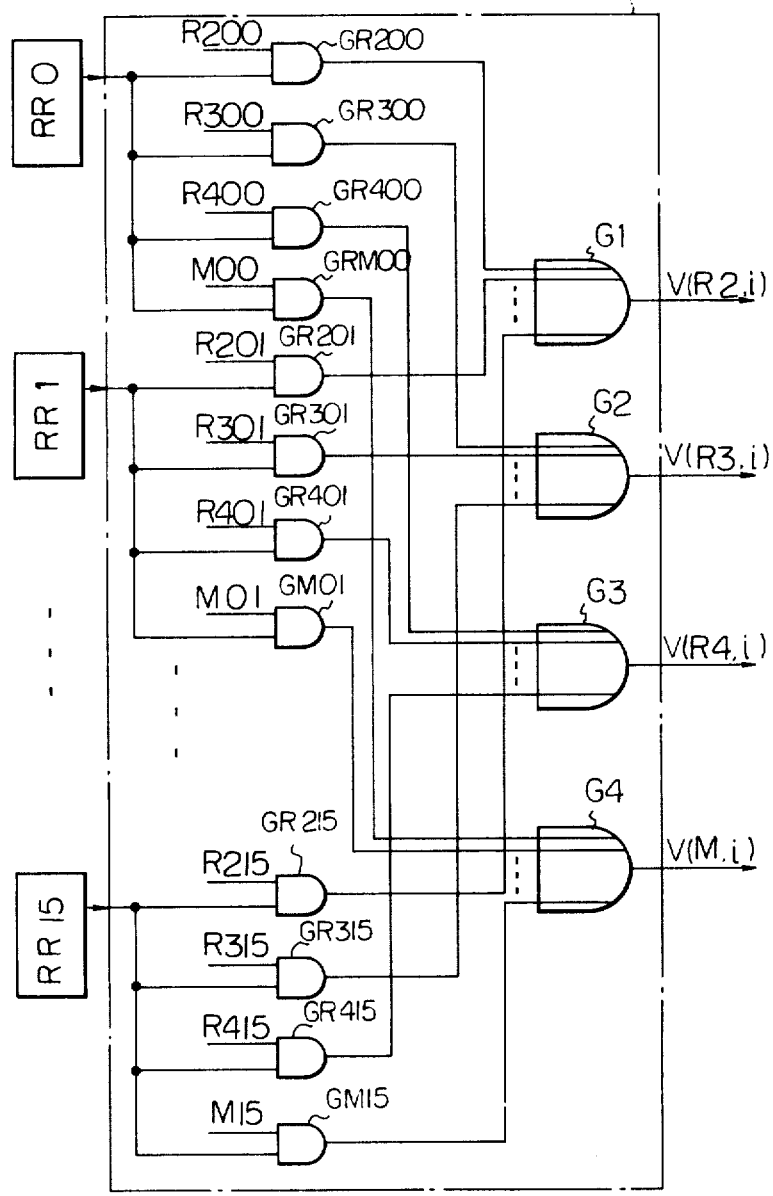
Figure 12:
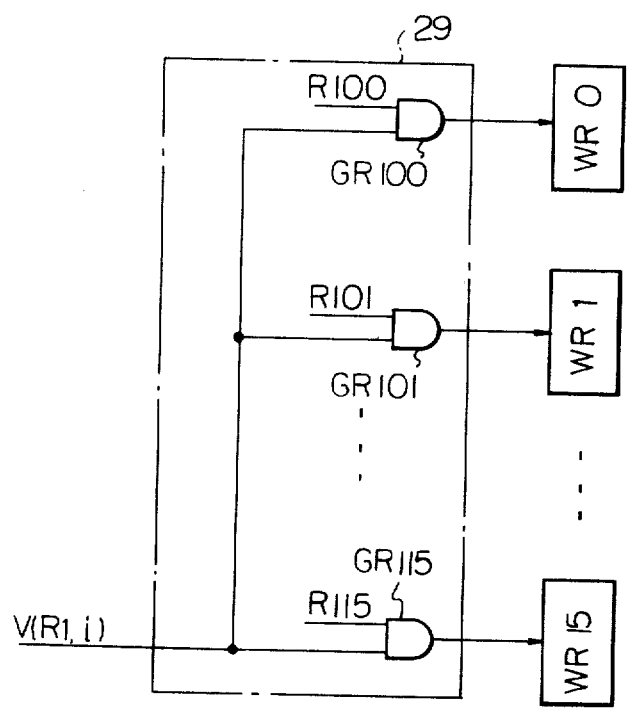
Figure 13:
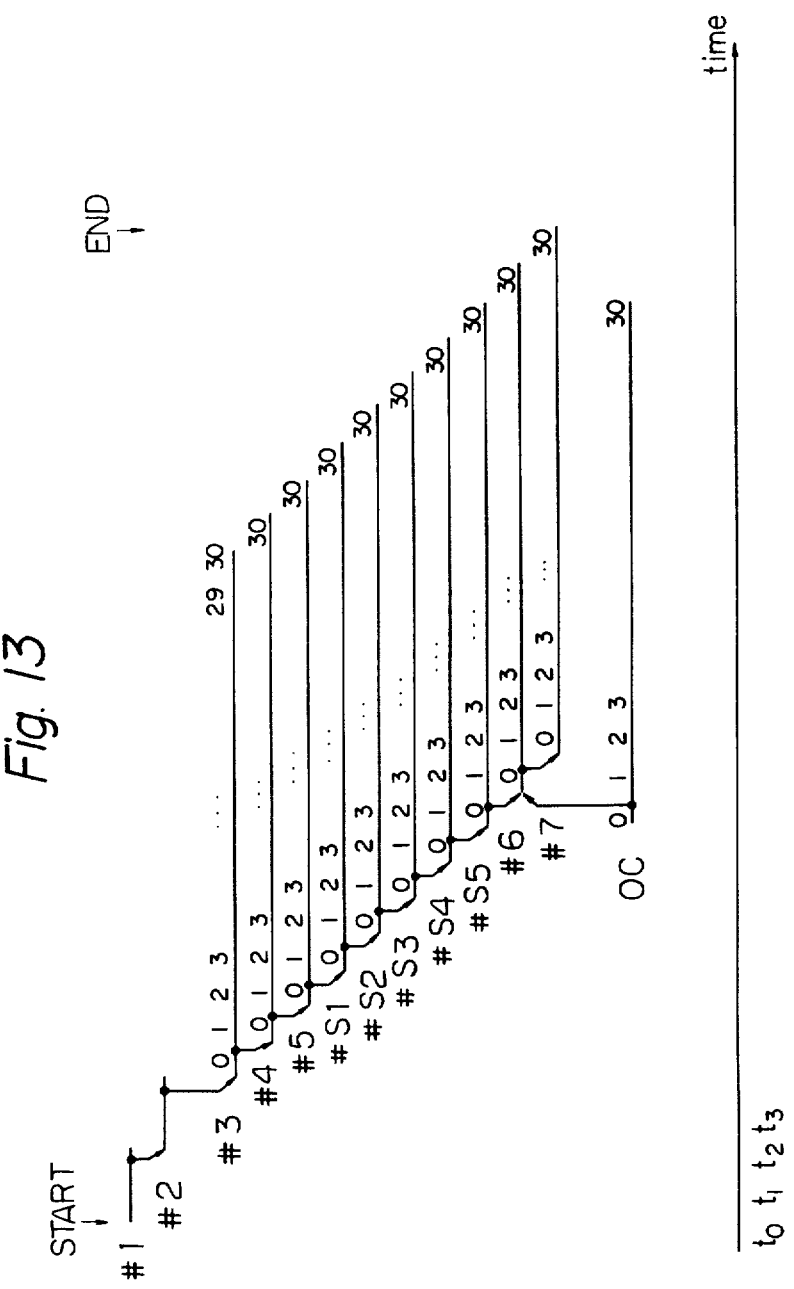

FIGS. 4a through 4e are block diagrams of the pipelines 2 and 5, for explaining the operation of the pipeline processing architecture of FIG. 3;

FIG. 5 is a block diagram illustrating a second embodiment of the pipeline processing architecture of the present invention;

FIGS. 6a through 6e are block diagrams of the pipelines 2 and 5', for explaining the operation of the pipeline processing architecture of FIG. 5;

FIG. 7 is a block diagram illustrating a third embodiment of the pipeline processing architecture of the present invention;

FIG. 8a through 8e are block diagrams of the pipelines 2' and 5, for explaining the operation of the pipeline processing architecture of FIG. 7;

FIG. 9 is a block diagram of the data processing system including the pipeline processing architecture of FIG. 3, 5 or 7;

FIG. 10 is a logic circuit diagram of the selector 22 of FIG. 9;

FIG. 11 is a logic circuit diagram of the input multiplexer of FIG. 9;

FIG. 12 is a logic circuit diagram of the output multiplexer of FIG. 9;

FIG. 13 is a timing diagram for explaining the operation of the data processing system of FIG. 9.

DETAILED DESCRIPTION OF THE PREFERRED EMBODIMENT

In FIG. 1, there is shown a prior art pipeline processing architecture for performing an arithmetical operation, for example, a vector addition operation as follows:

$$V(R1,i) = V(R2,i) + V(R3,i) \quad (2)$$

wherein

R1, R2 and R3 designate operands (register numbers) i=1,2, ..., n;
$V(R1,i)$, $V(R2,i)$ and $V(R3,i)$ designate the contents of areas designated by addresses (R1,i), (R2,i) and (R3,i), of a vector register (not shown), respectively.

The architecture comprises a data fetch facility 1 for receiving a group of data $V(R2,i)$ and $V(R3,i)$, a pipeline 2 composed of five arithmetic stages 2-1, 2-2, ..., 2-5, and a data store facility 3 for storing the operation result $V(R2,i)+V(R3,i)$ of the pipeline 2. In this case, the five arithmetic stages perform the following operations, simultaneously.

Stage 2-1: to compare the characteristic of $V(R2,i)$ with that of $V(R3,i)$ and to compute the difference thereof;

Stage 2-2: to shift the mantissa of the smaller one of the data $V(R2,i)$ and $V(R3,i)$ by the above-mentioned difference;

Stage 2-3: to add the mantissa of $V(R2,i)$ and that of $V(R3,i)$;

Stage 2-4: to detect non-significant digits in the sum $V(R2,i)+V(R3,i)$, and;

Stage 2-5: to shift the mantissa of the sum by the non-significant digits and modify the characteristic of the sum, in order to normalize the sum.

FIGS. 2a through 2e are block diagrams of the pipeline 2, for explaining the operation of the pipeline processing architecture of FIG. 1. Referring to FIG. 2a, a first group of data $V(R2,1)$ and $V(R3,1)$ read out by the data fetch facility 1 is transmitted to the first stage 2-1 of the pipeline 2 so that the first stage 2-1 performs the comparing operation upon the data $V(R2,1)$ and $V(R3,1)$. Next, the data $V(R2,1)$ and $V(R3,1)$ is transmitted from the first stage 2-1 to the second stage 2-2. Simultaneously, a second group of data $V(R2,2)$ and $V(R3,2)$ read out by the data fetch facility 1 is transmitted to the first stage 2-1 (see FIG. 2b). As a result, the first stage 2-1 performs the comparing operation upon the data $V(R2,2)$ and $V(R3,2)$, while the second stage 2-2 performs the shifting operation upon the data $V(R2,1)$ and $V(R3,1)$. Next, the data $V(R2,1)$ and $V(R3,1)$ is transmitted from the second stage 2-2 to the third stage 2-3, while the data $V(R2,2)$ and $V(R3,2)$ is transmitted from the first stage 2-1 to the second stage 2-2. Simultaneously, a third group of data $V(R2,3)$ and $V(R3,3)$ read out by the data fetch facility 1 is transmitted to the first stage 2-1 (see FIG. 2c). As a result, the stages 2-1, 2-2 and 2-3 perform their operations upon the data $V(R2,3)$ and $V(R3,3)$, the data $V(R2,2)$ and $V(R3,2)$, and the data $V(R2,1)$ and $V(R3,1)$, respectively. As shown in FIG. 2c, the operation result of the third stage 2-3 is the sum $V(R2,1)+V(R3,1)$. Next, the data $V(R2,1)+V(R3,1)$, the data $V(R2,2)$ and $V(R3,2)$, and the data $V(R2,3)$ and $V(R3,3)$ are transmitted from the stages 2-3, 2-2 and 2-1 to the stages 2-4, 2-3, 2-2, respectively. Simultaneously, a fourth group of data $V(R2,4)$ and $V(R3,4)$ read out by the data fetch facility 1 is transmitted to the first stage 2-1 (see FIG. 2d). As a result, the stages 2-1, 2-2, 2-3 and 2-4 perform their operations upon the data $V(R2,4)$ and $V(R3,4)$, the data $V(R2,3)$ and $V(R3,3)$, the data $V(R2,2)$ and $V(R3,2)$, and the data $V(R2,1)+V(R3,1)$, respectively. Next, the data $V(R2,1)+V(R3,1)$, the data $V(R2,2)+V(R3,2)$, the data $V(R2,3)$ and $V(R3,3)$, and the data $V(R2,4)$ and $V(R3,4)$ are transmitted from the stages 2-4, 2-3, 2-2 and 2-1 to the stages 2-5, 2-4, 2-3, 2-2, respectively. Simultaneously, a fifth group of data $V(R2,5)$ and $V(R3,5)$ read out by the data fetch facility 1 is transmitted to the first stage 2-1 (see FIG. 2e). As a result, the stages 2-1, 2-2, 2-3, 2-4 and 2-5 perform their operations upon the data $V(R2,5)$ and $V(R3,5)$, the data $V(R2,4)$ and $V(R3,4)$, the data $V(R2,3)$ and $V(R3,3)$, the data $V(R2,2)+V(R3,2)$, and the data $V(R2,1)+V(R3,1)$, respectively. Next, the data $V(R2,1)+V(R3,1)$ is transmitted to the data store facility 3 and, after that, the data $V(R2,1)+V(R3,1)$ is stored in an area designated by an address (R1,1) of the vector register. Thus, the sequence of the data $V(R2,1)$ and $V(R3,1)$, the data $V(R2,2)$ and $V(R3,2)$, ..., the data $V(R2,n)$ and $V(R3,n)$ is applied to the pipeline 2 so that the sequence of the sum of data $V(R2,1)+V(R3,1)$, the sum of data $V(R2,2)+V(R3,2)$, ..., the sum of data $V(R2,n)+V(R3,n)$ is obtained at the output of the pipeline 2. However, if arithmetic vector operations are associated with a conditional operation performed by using the pipeline processing architecture of FIG. 1, it is necessary to have two or more pipelines arranged in series with the pipeline 2. As a result, the total executing time becomes long.

FIG. 3 is a block diagram illustrating a first embodiment of the pipeline processing architecture of the present invention and FIGS. 4a through 4e are block diagrams of the pipelines 2 and 5, for explaining the operation of the pipeline processing architecture of FIG. 3. The elements illustrated in FIG. 3 which are identical with those of FIG. 1 are given the same reference numerals as used in FIG. 1. The architecture of FIG. 3 further comprises a pipeline 5 for processing conditional data $V(M,i)$ which is read out by a conditional data fetch facility 4 from an area designated by an address (M,i), of a vector register (not shown). In this case, the operations performed by the pipeline 5 are those for transmitting the conditional data. The data fetch facility 1 and the conditional data fetch facility 4 are synchronized on the same time base, so that the facility 4 reads out the data $V(M,i)$ from the area designated by the address (M,i) when the facility 1 reads out the data $V(R2,i)$ and $V(R3,i)$ corresponding the data $V(M,i)$. In addition, the pipeline 2 and the pipeline 5 are synchronized on the same time base, so that, for example, the first stage 5-1 performs its operation upon the data $V(M,i)$ when the first stage 2-1 performs its operation upon the data $V(R2,i)$ and $V(R3,i)$. Further, the architecture of FIG. 3 comprises an interrupt request signal generator 6 for generating an interrupt request signal INT depending upon the data at the output of the pipeline 5. Now, consider the following vector addition associated with a conditional operation.

$$V(R1,i) = V(R2,i) + V(R3,i) \quad (3)$$
if $V(R2,i) > V(R3,i)$.
No operation
if $V(R2,i) \leq V(R3,i)$.
$(i = 1,2,\ldots,n)$ Assume that "1" is prestored in an area designated by an address (M,i), of the registers, if the value of V(R2,i) is greater than that of V(R3,i), while "0" is prestored in an area designated by an address (M,i), of the vector registers, if the value of V(R2,i) is equal to or less than that of V(R3,i). At first, a first group of data V(R2,1) and V(R3,i) read out by the data fetch facility 1 is transmitted to the first stage 2-1 of the pipeline 2, and simultaneously, a first conditional data V(M,1) read out by the conditional data fetch facility 4 is transmitted to the first stage 5-1 of the pipeline 5 (see FIG. 4a). As a result, the first stage 2-1 performs its operation upon the group of data V(R2,1) and V(R3,1), but the first stage 5-1 performs no operation upon the conditional data V(M,1). After that, in the same way as the architecture of FIG. 1, the sequence of the data V(R2,1) and V(R3,1), V(R2,2) and V(R3,2), . . . , V(R2,n) and V(R3,n) flows through the stages 2-1, 2-2, . . . , 2-5 which perform their operations upon these data (see FIGS. 4a through 4e). In addition, the sequence of the data V(M,1), V(M,2), . . . , V(M,n) flows through the stages 5-1, 5-2, . . . , 5-5 which perform no operation except for transmission operations upon these data. The output signal generated from the last stage 5-5 is applied to the data store facility 3 and the interrupt request signal generator 6. As a result, if the data transmitted from the last stage 5-5 is "1", the data store facility 3 transmits the data received from the last stage 2-5 to an area designated by an address (R1,i), of the vector registers, and the generator 6 generates no interrupt request signal INT. On the contrary, if the data transmitted from the last stage 5-5 is "0", the data store facility 3 does not transmit the data received from the last stage 2-5 to the area designated by the address (R1,i), of the vector registers, and the generator 6 generates an interrupt request signal INT. Thus, each of the sums of data V(R2,i)+V(R3,i)=(VR-1,i) whose operations are performed by the pipeline 2 is determined to be valid or invalid at the data store facility 3 which receives the conditional data V(M,i) transmitted by the pipeline 5. Therefore, the total executing time of the pipeline processing architecture of FIG. 3 is determined by only the pipeline processor 2 so that the time is relatively small.

FIG. 5 is a block diagram illustrating a second embodiment of the pipeline processing architecture of the present invention, and FIGS. 6a through 6e are block diagrams of the pipelines 2 and 5', for explaining the operation of the pipeline process architecture of FIG. 5. The elements illustrated in FIG. 5 which are identical with those of FIG. 3 are given the same reference numerals as used in FIG. 3. The architecture of FIG. 5 comprises a pipeline 5' similar to the pipeline 5 (FIG. 3). The pipeline 5' processes data V(R4,i) which is stored in an area designated by an address (R4,i), of the vector registers. In this case, since the data V(R4,i) is unconditional data, the conditional data corresponding to the data V(M,i) of FIG. 3 whose value is "1" or "0" is formed in a stage of the pipeline 5'. Now, consider the following vector addition associated with a conditional operation.

$$V(R1,i) = V(R2,i) + V(R3,i) \quad (4)$$
if $V(R4,i) > 0$.
No operation
if $V(R4,i) \leq 0$.
$(i = 1, 2, \ldots, n)$ In FIG. 5, the second stage 5'-2 of the pipeline 5' performs as comparing operation for comparing the value of the data V(R4,i) with zero. As a result, if the value of the data V(R4,i) is greater than zero, "1" is written into the stage 5'-2, while, if the value of the data V(R4,i) is equal to or less than zero, "0" is written into the stage 5'-2. Thus, the "1" or "0" which serves as the conditional data V(M,i) of FIG. 3 is transmitted from the stage 5'-2 to the stage 5'-5 (see FIG. 6b through 6e). Therefore, the data store facility 3 and the interrupt request signal generator 6 of FIG. 5 operate in the same way as those of FIG. 3. Therefore, each of the sums of data V(R2,i)+V(R3,i) (=V(R1,i)) whose operations are performed by the pipeline 2 is determined to be valid or invalid at the data store facility 3 which receives the conditional data, corresponding to the data V(M,i) of FIG. 3, formed by the pipeline 5'. Also, the total executing time of the pipeline processing architecture of FIG. 5 is determined only by the pipeline processor 2 so that the time is relatively small.

FIG. 7 is a block diagram illustrating a third embodiment of the pipeline processing architecture of the present invention, and FIGS. 8a through 8e are block diagrams of the pipelines 2' and 5, for explaining the operation of the pipeline processing architecture of FIG. 7. The elements illustrated in FIG. 7 which are identical with those of FIG. 3 are give the same reference numerals as those used in FIG. 3. The architecture of FIG. 7 comprises a pipeline 2', which is the same as the pipeline 2 of FIG. 3, wherein an output of the pipeline 2' is connected to an input thereof. In addition, the architecture of FIG. 7 comprises a data fetch facility 1' which includes a zero generator 1'-1 and a gate means 1'-2 controlled by the conditional data fetch facility 4. For example, if the conditional data V(M,i) read out by the conditional data fetch facility 4 is "1", the gate means 1'-2 applies the data V(R2,i) to the pipeline 2'. On the contrary, if the conditional data V(M,i) is "0", the gate means 1'-2 applies the value "0" generated from the zero generator 1'-1 to the pipeline 2'. Now, consider the following cumulative vector addition associated with a conditional operation.

$$\sum_{i=1}^{n} V(R2,i) = V(R2,1) + V(R2,2) + \ldots + V(R2,n) \quad (5)$$
where $V(R2,i) = 0$ if $V(R2,i) \leq 0$.

Assume that "1" is prestored in an area designated by an address (M,i), of the vector registers, if the data V(R2,i) is greater than zero, while "0" is prestored in the area designated by the address (M,i), of the vector registers, if the data V(R2,i) is equal to or less than zero. In FIG. 8a through 8e, assume that the second conditional data V(M,2) and V(M,8) equals zero and the number n of elements equals 15. At first, the data V(R2,1) and V(M,1) are read out by the data fetch facility 1' and the conditional data fetch facility 4, respectively. In this case, since the data V(M,1) is "1", the data V(R2,1) is transmitted through the gate means 1'-2 to the first stage 2'-1 which also receives the value "0" of the last stage 2'-5 (see FIG. 8a). The first stage 2'-1 performs its operation upon the data "0" and V(R2,1), while the first stage 5-1 performs no operation. Next, the data V(R2,2) and V(M,2) are read out by the facilities 1' and 4, respectively. In this case, since the data V(M,2) is "0", the value "0" of the zero generator 1'-1 is applied through the gate means 1'-2 to the first stage 2'-1 which also receives the value "0" of the last stage 2'-5 (see FIG.

8b). Finally, the operation results of the last stage 2'-5 are as follows.

V(R2,1)+V(R2,6)+V(R2,11)
V(R2,7)+V(R2,12)
V(R2,3)+V(R2,13)
V(R2,4)+V(R2,9)+V(R2,14)
V(R2,5)+V(R2,10)+V(R2,15)

These five values are stored into five areas designated by addresses (R1,11), (R1,12), (R1,13), (R1,14) and (R1,15), respectively, of the vector registers. Therefore, the vector sum $$\sum_{i=1}^{15} V(R2,i)$$

wherein V(R2,i)=0 if V(R2,i)≦0 is obtained by adding these five values. Thus, each of the data V(R2,i) is determined to be valid or invalid according to the conditional data V(M,i), before the data V(R2,i) is applied to the pipeline 2'. Also, the total executing time of the architecture of FIG. 7 is determind by only the pipeline 2' so that the time is relatively small.

FIG. 9 is a block diagram of the data processing system including the pipeline processing architecture of FIGS. 3, 5 or 7. In FIG. 9, a pipeline processing architecture 10 is controlled by an operation register 21. The operation register 21 is composed of an instruction code field 21-1 for indicating the kind of operation such as the above-mentioned formulas (3), (4) and (5), an input field 21-2 for indicating the address (R1) of an input vector register, output fields 21-3, 21-4 and 21-5 for indicating the addresses (R2), (R3) and (R4) of output vector registers, and a mask field 21-6 for indicating the address (M) of a mask vector register. These registers are selected among, for example, sixteen vector registers V-0, V-1, . . . , V-15 indicated by reference numeral 27. Each of the vector registers is composed of, for example, 30 elements having addresses. In this case, the element at i-th row and j-th column of the vector registers 27 is a j-th element of the vector register V-i.

In a read operation wherein the data stored in the vector registers 27 is read out and supplied to the pipeline processing architecture 10, the data stored in i-th elements of the selected vector registers is read out. The "i" is indicated by an input address counter 23 and is transmitted through an input multiplexer 28 to the pipeline processing architecture. The value of the counter 23 is incremented +1 at every read operation for the vector registers 27. On the other hand, in a write operation wherein the operation result of the pipeline processing architecture 10 is written into the vector registers 27, the operation result by the architecture 10 stored in a data store 3-1 of a data store facility 3 is transmitted through an output multiplexer 29 to i'-th element of the vector register selected as an input register wherein "i'" is indicated by an output address counter 26. The value of the counter 26 is incremented +1 at every write operation. In FIG. 9, the reference numeral 24 indicates a counter for storing the number of elements of the vector registers, for example, 30, and the reference numeral 25 indicates a comparator for comparing the value of the input address counter 23 with that of the counter 24. When these values coincide, the sequence of operations indicated by the operation register 21 is completed. An AND gate 30 is used for passing the interrupt request signal INT only when the potential of the output signal of data store 3-2 of the data store facility 3, for presenting an overflow in the operation result by the pipeline 2(2'), is high. In addition, the reference numeral 31 indicates a timing generator for scheduling the operation of the selector 22. Next, the selector 22 which produces strobe signals to the vector register 27 will be explained in detail.

FIG. 10 is a logic circuit diagram of the selector 22 of FIG. 9. In FIG. 10, each of decoders D-R1, D-R2, D-R3, D-R4 and D-M decode the data stored in the fields 21-2, 21-3, 21-4, 21-5 and 21-6, respectively, so that one of signals R100, R101, . . . , R115, one of signals R200, R201, . . . , R215, one of signals R300, R301, . . . , R315, one of signals R400, R401, . . . , R415, and one of signals M00, M01, . . . , M15 are selected. Therefore, only five vector registers (FIG. 9) are strobed in synchronization with a timing signal generated from the timing generator 31. These signals R200, R201, . . . , R215; R300, R301, . . . , R315; R400, R401, . . . , R415, and; M00, M01, . . . , M15 are applied to the input multiplexer 28, while the signals R100, R101, . . . , R115 are applied to the output multiplexer 29.

FIG. 11 is a logic circuit diagram of the input multiplexer 28 of FIG. 9. The input multiplexer 28 is used for transmitting the data stored in the vector registers 27 to the pipeline architecture 10 (FIG. 9). For example, if the data V(R2,i) is stored in the vector register V-0 (FIG. 9), the level of the signal R200 is high, while the levels of the signals R201 through R215, R300, R400 and M00 are low. As a result, the data stored in the vector register V-0 is transmitted through a read register RR0, an AND gate GR200 and an OR gate G1 to a data fetch facility 1-1. Similarly, if the data V(M,i) is stored in the vector register V-1 (FIG. 9), the level of the signal M01 is high, while the levels of the signals M00, M02 through M15, R201, R301 and R401 are low. As a result, the data stored in the vector register V-1 is transmitted through a read register RR1, an AND gate GM01 and an OR gate G4 to a conditional data fetch facility 4. Thus, the data stored in the vector registers is transmitted to the pipeline architecture 10 by the input multiplexer 28.

FIG. 12 is a logic circuit diagram of the output multiplexer 29 of FIG. 9. The output multiplexer 29 is used for transmitting the data V(R1,i) of the data store 3-1 to a vector register designated by the input field 21-2. For example, if the data V(R1,i) will be stored in the vector register V-15, the level of the signal R115 is high, while the levels of the signals R100, R101, . . . , R114 are low. As a result, the data stored in the data storage facility 3-is transmitted through an AND gate GR115 and a write register 15 to the vector register V-15, when the data stored in the last stage 5-5(5'-5) (FIG. 9) is "1". Thus, the operation result is transmitted to the vector registers 27 (FIG. 9) by the output multiplexer 29.

FIG. 13 is a timing diagram for explaning the operation of the data processing system of FIG. 9. In FIG. 13, steps #1, #2, . . . are defined as follows:

Step #1: to set the operation register 21;

Step #2: to load the data from a main memory (not shown in FIG. 9) to the vector registers 27 and to select some of the vector registers by the selector 22;

Step #3: to increment the input address counter 23 by one;

Step #4: to set a read address by using the value of the counter 23;

Step #5: to read out the data by the data fetch facilities 1-1, 1-2 and the conditional data fetch facility 4;

Step #S1: to perform a predetermined operation upon the data by the first stages 2-1(2'-1) and 5-1(5'-1);

Step #S2: to perform a predetermined operation upon the data by the second stages 2-2(2'-2) and 5-2(5'-2);

Step #S3: to perform a predetermined operation upon the data by the third stages 2-3(2'-3) and 5-3(5'-3);

Step #S4: to perform a predetermined operation upon the data by the fourth stages 2-4(2'-4) and 5-4(5'-4);

Step #S5: to perform a predetermined operation upon the data by the fifth stages 2-5(2'-5) and 5-5(5'-5);

Step #6: to set a write address by using the value of the output address counter 26;

Step #7: to write the data stored in the data store 3-1 into the selected vector register.

In this case, the operation of the fifth stages and that of the output address counter 26 are synchronized and the value of the counter 24 is, for example, 30.

As explained hereinbefore, the data processing system with a pipeline processing architecture according to the present invention has an advantage that the processing speed is two or three times greater than that of the prior art, because the total executing time of the architecture of the present invention is determined by only one pipeline, i.e., the time corresponding to nt+d (Step 3) in the above-mentioned equation (1).

What is claimed is:

1. A data processing system having a pipeline processing architecture for processing a plurality of groups of data, including a group of conditional data, and for performing a sequence of operations upon each of the plurality of groups of data except the group of conditional data, comprising:

first pipeline means, having stages, for performing the sequence of operations upon each of the plurality of groups of data except the group of conditional data and for generating an operation result; and second pipeline means, having stages, for transmitting the group of conditional data therein, wherein the stages of said first pipeline means and the stages of said second pipeline means are equal in number and synchronized on the same time base, and wherein said second pipeline means is operatively connected to said first pipeline means, whereby the operation result of said first pipeline means is determined to be valid or invalid at the exit thereof in dependence upon the conditional data transmitted by said second pipeline means.

2. A system as set forth in claim 1, further comprising:

vector registers for storing said plurality of groups of data;

first data fetch means, operatively connected to said vector registers and said first pipeline means, for receiving each of the plurality of groups of data except the one group of conditional data and for transmitting each of the plurality of groups of data except the one group of conditional data to said first pipeline means;

second data fetch means, operatively connected to said vector registers and said second pipeline means, for receiving the group of conditional data and for transmitting the group of conditional data read to said second pipeline means; and data store means, operatively connected to said vector registers and said first and second pipeline means, for transmitting the operation result of said first pipeline means only when the conditional data is in a first logic state.

3. A system as set forth in claim 2, further comprising an interrupt request signal generator, operatively connected to said second pipeline means and said data store means for generating an interrupt request signal only when the conditional data is in a second logic state.

4. A data processing system with a pipeline processing architecture for processing a plurality of groups of data, including a group of conditional data, and for performing a sequence of operations upon each of a plurality of groups of data except the group of conditional data, comprising:

first data fecth means for receiving each of the plurality of groups of data except the group of conditional data;

second data fetch means, operatively connected to said first data fetch means, for receiving the conditional data and for providing a controlling signal, in dependence upon the conditional data, to said first data fetch means, whereby each of the plurality of groups of data except the group of conditional data is determined to be valid or invalid in dependence upon said controlling signal;

first pipeline means, operatively connected to said first data fetch means, for performing the sequence of operations upon each of the plurality of groups of data, except the group of conditional data, which is determined to be valid; and second pipeline means, operatively connected to said second data fetch means, for transmitting said conditional data therein, wherein the stages of said first pipeline means and those of said second pipeline means are equal in number and synchronized on the same time base, whereby each of the plurality of groups of data except the group of conditional data is determined to be valid or invalid at the entry of the first pipeline, in dependence upon said controlling signal.

5. A system as set forth in claim 4, wherein an output of said first pipeline means is connected to an input thereof, whereby cumulative addition or multiplication can be performed.

6. A data processing system as set forth in claim 5, further comprising:

vector registers, operatively connected to said first data fetch means, said second data fetch means and said first and second pipeline means, for storing said plurality of groups of data;

data store means, operatively connected to said vector registers and said first and second pipeline means, for transmitting the operation result of said first pipeline means; and an interrupt request signal generator, operatively connected to said second pipeline means and said data store means, for generating an interrupt request signal in dependence upon the conditional data.

7. A data processing system as set forth in claim 6, wherein said first data fetch means comprises:

a zero generator circuit for generating zeros;

gate means, operatively connected to said zero generator circuit, said first pipeline means, said vector registers and said second data fetch means, for receiving each of the plurality of groups of data except the group of conditional data and for generating an output data signal comprising one of the plurality of groups of data except the group of conditional data or zero in dependence upon said controlling signal.

8. A system as set forth in claim 3 or 6, further comprising:
an operation register for providing a data field signal;
a timing generator for generating a timing signal;
a selector circuit, operatively connected to said operation register, said timing generator and said vector registers, for decoding said data field signal and for selectively accessing said vector registers in dependence upon the decoded data field signal and said timing signal;
an input multiplexer circuit, operatively connected to said vector registers, said selector circuit and said first and second data fetch means, for transmitting the data contained in the selectively accessed vector registers, except the one group of conditional data, to said first data fetch means and for transmitting the conditional data read out from said selectively accessed vector registers to said second data fetch means;
an output multiplexer circuit, operatively connected to said data store means, said selector circuit and said vector registers for transmitting the output of said data store means to said selectively accessed vector registers.

9. A system as set forth in claim 8, further comprising:
an input address counter, operatively connected to said selector circuit, for providing a first vector register selection signal to said selector circuit when data is to be read from said selectively accessed vector registers to said input multiplexer circuit; and
an output address counter, operatively connected to said selector circuit, for providing a second vector register selection signal to said selector circuit when data is to be written into said selectively accessed vector registers from said output multiplexer circuit.

10. A data processing system with a pipeline processing architecture for processing a plurality of groups of data, including a group of specified data for determining the condition of said sequence of operations, and for performing a sequence of operations upon each of a plurality of groups of data except the group of specified data, comprising:
first pipeline means, having stages, for performing said sequence of operations upon each of said plurality of groups of data except the group of specified data and for generating an operation result;
second pipeline means, having stages, for converting the group of specified data to conditional data, wherein the stages of said first pipeline means and those of said second pipeline means are equal in number and synchronized on the same time base, and wherein said second pipeline means is operatively connected to said first pipeline means, whereby the operation result of said first pipeline means is determined to be valid or invalid at the exit thereof, in dependence upon said conditional data.

11. A system as set forth in claim 10, further comprising:
vector registers for storing said plurality of groups of data;
first data fetch means, operatively connected to said vector registers and said first pipeline means, for transmitting each of said plurality of groups of data read out from said vector registers, except the group of specified data, to said first pipline means;
second data fetch means, operatively connected to said vector registers and said second pipeline means, for receiving said specified data read out from said vector registers and for transmitting said specified data to said second pipeline means; and
data store means, operatively connected to said first and second pipeline means and to said vector registers, for transmitting the operation result of said first pipeline means to said vector registers only when said conditional data is in a first logic state.

12. A system as set forth in claim 11, further comprising an interrupt request signal generator, operatively connected to said data store means and said second pipeline means, for generating an interrupt request signal only when said conditional data is in a second logic state.

13. A system as set forth in claim 12, further comprising:
an operation register for providing a data field signal;
a timing generator for generating a timing signal;
a selector circuit, operatively connected to said operation register, said timing generator and said vector registers, for decoding said data field signal and for selectively accessing said vector registers in dependence upon the decoded data field signal and said timing signal;
an input multiplexer circuit, operatively connected to said vector registers, said selector circuit and said first and second data fetch means for transmitting the data contained in the selectively accessed vector registers, except the one group of specified data, to said first data fetch means and for transmitting the specified data read out from said selectively accessed vector registers to said second data fetch means;
an output multiplexer circuit, operatively connected to said data store means, said selector circuit and said vector registers for transmitting the output of said data store means to said selectively accessed vector registers.

14. A system as set forth in claim 13, further comprising:
an input address counter, operatively connected to said selector circuit, for providing a first vector register selection signal to said selector circuit when data is to be read from said selectively accessed vector registers to said input multiplexer circuit; and
an output address counter, operatively connected to said selector circuit, for providing a second vector register selection signal to said selector circuit when data is to be written into said selectively accessed vector registers from said output multiplexer circuit.

* * * * *

UNITED STATES PATENT AND TRADEMARK OFFICE
CERTIFICATE OF CORRECTION

PATENT NO. : 4,270,181

DATED : May 26, 1981

INVENTOR(S) : YOSHIYUKI TANAKURA ET AL.

It is certified that error appears in the above—identified patent and that said Letters Patent is hereby corrected as shown below:

Front Page, (73) should read -- Fujitsu Limited, Kanagawa, Japan--.

Front Page, [57], Abstract, line 4, after "conditional" insert --data--.
   Col. 1, line 60, "operation:" should be --operations;--.
   Col. 2, between lines 30 and 31, insert
        --BRIEF DESCRIPTION OF THE DRAWINGS--.
   Col. 3, line 2, "EMBODIMENT" should be --EMBODIMENTS--.
   Col. 5, line 35, "(VR-" should be --V(R- --.
   Col. 7, line 21, "determind" should be --determined--;
      line 60, "30" should not be in heavy type.
   Col. 8, line 5, "register" should be --registers--;
      line 17, "R415," should be --R415;--;
      line 18, "and;" should be --and--;
      line 50, "3-is" should be --3 is--.
   Col. 9, line 20, "30" should not be in heavy type.
   Col. 10, line 14, "fecth" should be --fetch--.
   Col. 11, line 46, "of a" should be --of the--.

Signed and Sealed this

Eighth Day of December 1981

[SEAL]

Attest:

*Attesting Officer*

GERALD J. MOSSINGHOFF

*Commissioner of Patents and Trademarks*